Nov. 3, 1970  J. I. BULGAKOV ET AL  3,538,430
DEVICE FOR DETECTING ORE BODIES BY MEASURING UNSTABLE
ELECTROMAGNETIC FIELDS EXCITED BY
MAGNETIC FIELD PULSES
Filed May 18, 1967  5 Sheets-Sheet 2

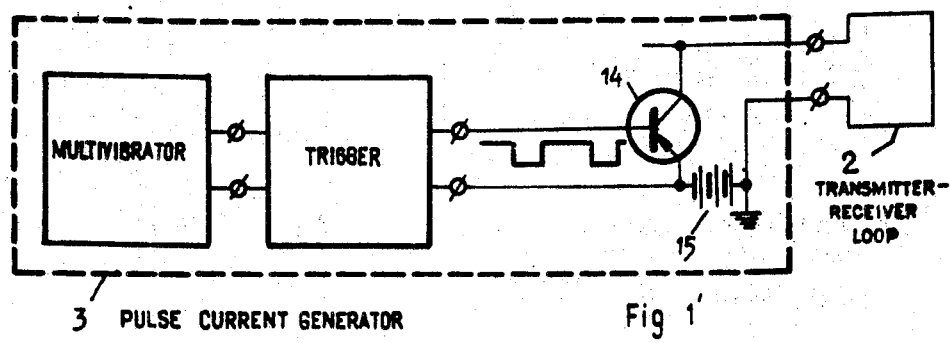

Fig 1'

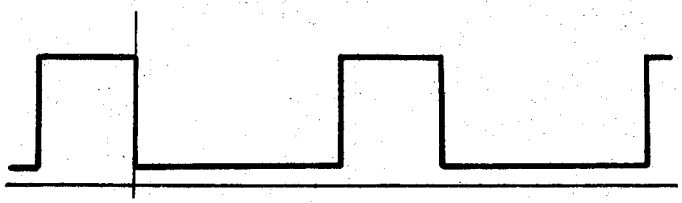

Fig. 2'A — CURRENT PULSES I

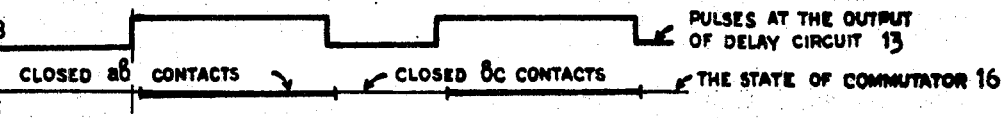

Fig. 2'B — PULSES AT THE OUTPUT OF DELAY CIRCUIT 13
Fig. 2'C — THE STATE OF COMMUTATOR 16

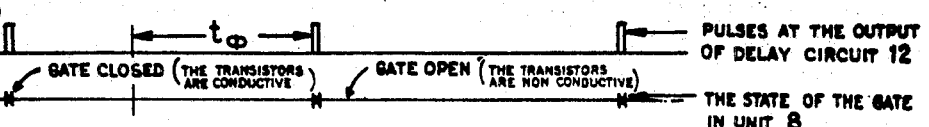

Fig. 2'D — PULSES AT THE OUTPUT OF DELAY CIRCUIT 12
Fig. 2'E — THE STATE OF THE GATE IN UNIT 8

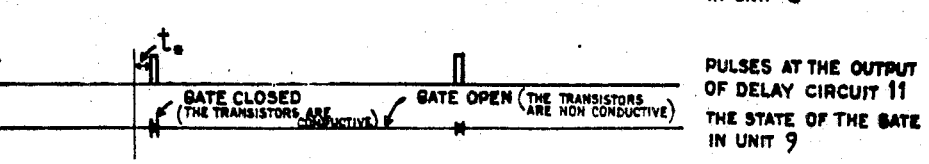

Fig. 2'F — PULSES AT THE OUTPUT OF DELAY CIRCUIT 11
Fig. 2'G — THE STATE OF THE GATE IN UNIT 9

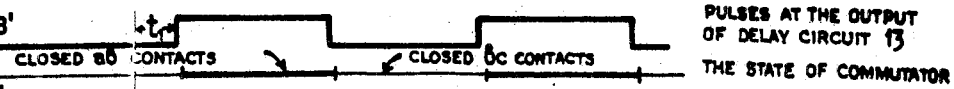

Fig. 2'B' — PULSES AT THE OUTPUT OF DELAY CIRCUIT 13
Fig. 2'C' — THE STATE OF COMMUTATOR 16

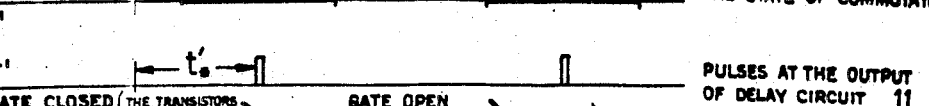

Fig. 2'F' — PULSES AT THE OUTPUT OF DELAY CIRCUIT 11
Fig. 2'G' — THE STATE OF THE GATE IN UNIT 9

United States Patent Office 3,538,430
Patented Nov. 3, 1970

3,538,430
DEVICE FOR DETECTING ORE BODIES BY MEASURING UNSTABLE ELECTROMAGNETIC FIELDS EXCITED BY MAGNETIC FIELD PULSES
Jury Ivanovich Bulgakov, Vsevolozhsky raion, pos. Steklyanny 35, kv. 23, Leningradskaya obl., U.S.S.R.; Alexandr Borisovich Velikin, Ananievskaya ul. 9, kv. 77; Georgy Osipovich Grigoriev, Ul. Sicezzhinskaya 23, kv. 1; and Anatoly Mikhailovich Polikarpov, Vasilievsky ostrov. 15 linia 72, kv. 48, all of Leningrad, U.S.S.R.
Filed May 18, 1967, Ser. No. 639,580
Int. Cl. G01v 3/12
U.S. Cl. 324—6          3 Claims

ABSTRACT OF THE DISCLOSURE

A device for inductive electrical prospecting by the method of transient processes, intended for detecting ore bodies, characterized by high electrical conductivity, comprising a current pulse generator, transmitter-receiver loop, blocking device, pulse amplifier, memory cell, synchronous gate and register, as well as an attachment for measuring the transient characteristics of the loop self-impedance (the ratio between the EMF values in the loop at pre-set moments to the exciting current in the same loop. This device allows to suppress considerably the slowly fluctuating electromagnetic noises and to increase the measuring channel sensitivity when using one loop for exciting the primary field and reception of the secondary fields by utilizing a special blocking means at the amplifier input and a memory circuit at the output of the amplifier.

The present invention relates to electrical prospecting apparatus to be used for the detection of electrically conductive bodies.

This invention particularly relates to an induced pulse transient system wherein a pulsed electromagnetic field is set up and its transient response measured.

In accordance with the invention this system is mainly designed for prospecting ore bodies characterized by high electrical conductivity as well as for geological mapping.

Devices are known in the art comprising an oscillograph connected through a direct current amplifier with a receiver coil. The signal is recorded by a camera immediately after the interruption of the flow direct current in the loop serving as a source of the electromagnetic field.

In these devices due to the direct coupling of the oscillograph through the amplifier with the receiver coil all the noises simultaneously acting with the signal are registered.

With the view of improving the noiseproof feature of the system other apparatus was developed comprising a pulse generator, a transmitter coil, a receiver coil connected with an electric measuring unit through a pulse amplifier and a synchronous filter.

In this apparatus noise is suppresed in a wide frequency spectrum, however the use of a synchronous filter does not secure the elimination of constant and slowly fluctuating noise.

In accordance with the above, the object of the present invention is the development of a system having an improved noiseproof feature and hence higher sensitivity and a larger radius of action.

Another object of the invention is the development of an apparatus free from the overload of the measuring channel due to the residual voltage of the generator during the intervals between the exciting pulses. This overload occurs in devices in which one and the same loop (coil) is used for the excitation and the reception of the electromagnetic field.

A further object of the present invention is the development of an apparatus having an improved accuracy of measurement.

A still further object of the present invention is the development of an apparatus in which the measuring unit is free from the overload caused by a high intensity signal immediately following the exciting pulse of the electromagnetic field when measuring the later stages of the signal.

In order to achieve the above mentioned objects it has been found possible to develop a system in which elements would be provided insuring an improved noiseproof feature as regards constant and slowly fluctuating noise and elements protecting the system from the overload caused by the generator feeding the transmitter-receiver loop and from the overload caused by the signal immediately following the exciting pulse of the electromagnetic field.

The problem is solved by utilizing an apparatus comprising a transmitter-receiver loop connected to the pulse generator, the lop being also connected with an electric measuring unit through a blocking means, a pulse amplifier and a synchronous filter.

In contradistinction to other systems known in the art a signal level clamping circuit synchronized by said generator is inserted in this system between the output of the amplifier and the synchronous filter and is switched in at the end of the interval between the exciting pulses, whereby only the signal characterizing the properties of conducting bodies adjacent to the loop (or coil) and free from constant and slowly fluctuating noises is passed to the electric measuring unit.

It is expedient to insert a gain control into the circuit of the pulse amplifier, said gain control being so tuned that the voltage fed to the input of the amplifier, proportional to the exciting current in the loop be characterized by a constant reading of the electric measuring unit, this resulting in a direct measuring of the signal-to-exciting current intensity ratio and in an increase of measurement accuracy.

A generator pulse delay circuit may be inserted between the generator and the commutator, said delay circuit providing feeding of the amplifier only with that portion of the signal, which is within the dynamic range of the amplifier, the measuring channel being thus protected from signal overloads.

The invention will further become evident from a consideration of the description of an exemplary embodiment thereof and the accompanying drawings in which:

FIG. 1 shows a block diagram of the apparatus in accordance with the invention;

FIG. 1' shows the use of a trigger;

FIG. 2 shows an electric circuit diagram in accordance with the invention;

FIGS. 2' A–G' are signal charts;

FIG. 3 shows a diagram of current pulses in the loop inducing secondary currents in electrically conductive bodies;

FIG. 3' is a signal diagram;

FIG. 4 shows a diagram of voltages in the loop adjacent to electrically conductive bodies;

FIG. 4' is a signal diagram;

FIG. 6 shows a diagram of the pulse amplifier output voltage while detecting an electrically conductive body with the indication of the moment when the signal level clamping circuit is switched in;

Figure 1:
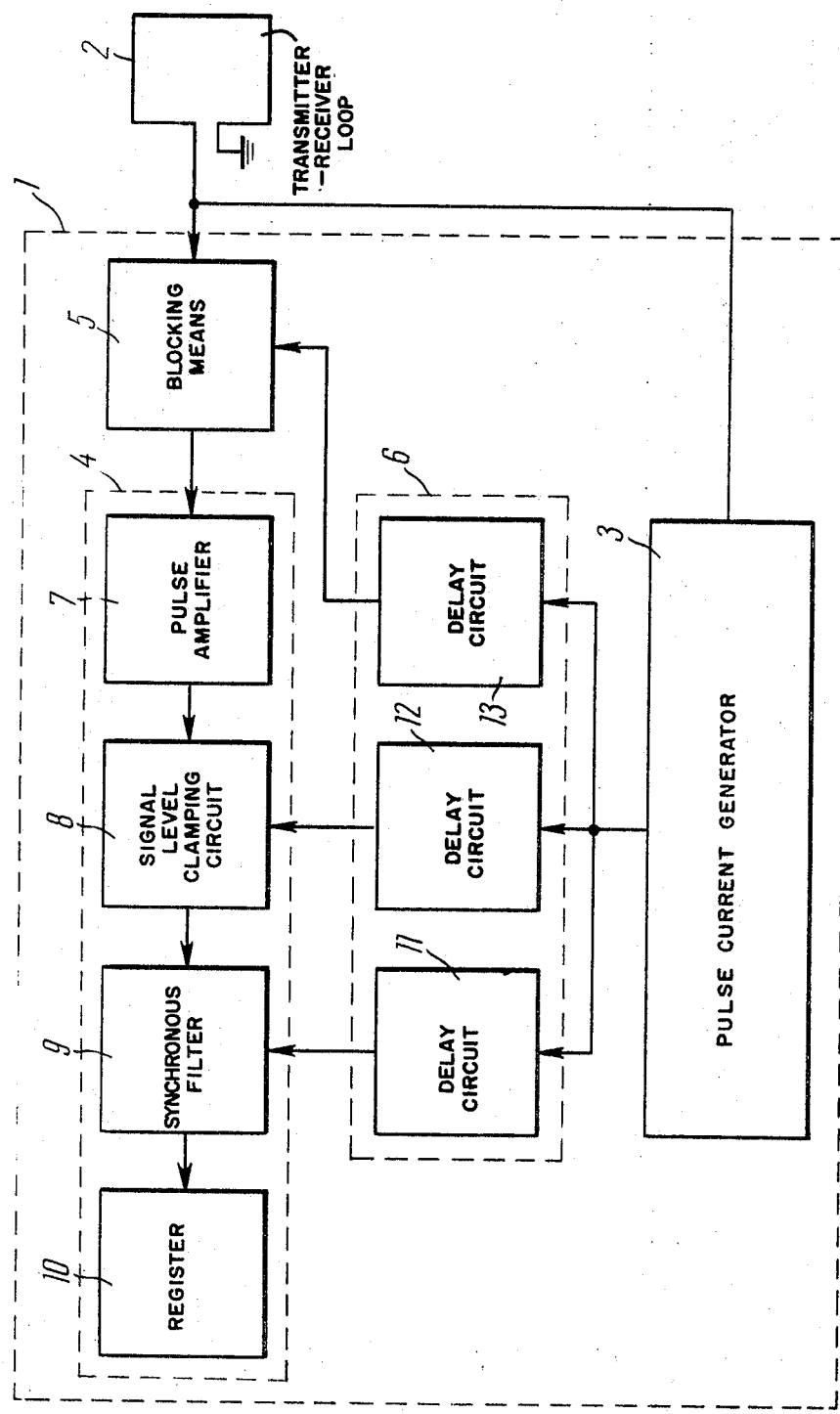

The apparatus as shown in FIG. 1 comprises a generator-measuring unit 1, and a transmitter-receiver loop 2 connected to it.

The generator-measuring unit 1 comprises a pulse current generator connected to the transmitter-receiver loop 2, a measuring channel 4 connected through a blocking means 5 with the loop 2, a circuit 6 producing commutation pulses controlling the operation of the measuring channel 4 and the blocking means 5. The circuit 6 is synchronized by the generator 3.

The transmitter-receiver loop 2 consists of one or a plurality of turns of insulated wire from several meters to several hundred meters in length along the perimeter.

The measuring channel 4 comprises a pulse amplifier 7 connected in series with the register 10 through an amplified signal level clamping circuit and a synchronous filter 9.

The circuit 6 producing commutation pulses comprises a circuit 11 for the delay of pulses controlling the operation of the synchronous filter, circuit 12 for the delay of pulses controlling the signal level clamping circuit 8 and circuit 13 for the delay of pulses controlling the blocking means 5.

The current pulse generator 3 (FIG. 2) comprises a powerful transistor gate 14 periodically connecting direct current source 15 with the loop 2.

The blocking means 5 comprises a commutator 16 which is essentially a polarized relay controlled by the circuit 13.

A capacitor 17 is provided at the input of the commutator 16 whilst the output of the commutator 16 is shunted by resistance 18.

The pulse amplifier 7 consists of two transistorized units, viz. transistors 19–21 and 22–24, which are fed from accumulators or storage batteries 25–26 and are connected in series with one another through a low pass filter 27 of the LC type. A gain control 28 is provided at the output of the amplifier, said gain control being essentially a potentiometer.

The signal level clamping circuit 8 comprises a capacitor 29 connected in series with a transistorized gate (transistors 30–31), controlled by the circuit 12.

The synchronous filter 9 is a transistorized gate (transistors 32–33) controlled by the circuit 11 and connected in series with a storage capacitor 34.

The register 10 may be an electric meter or a recorder and may include a direct current amplifier.

Figure 2:
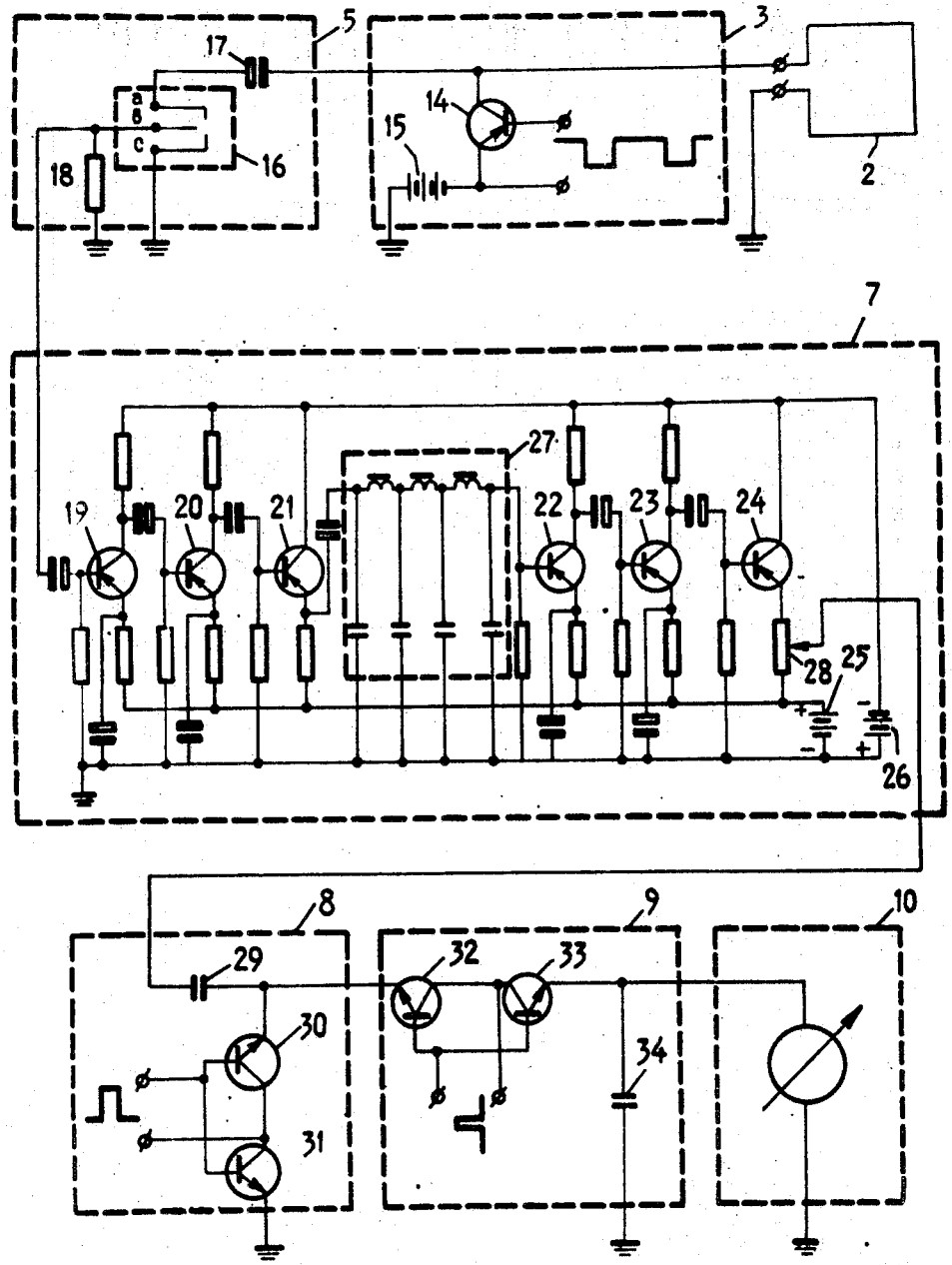

Concerning the device's operation: the current pulse generator 3 (FIG. 1) comprises an ordinary multivibrator and trigger, the latter being connected to a transistor gate 14 (FIG. 2, see also FIG. 1').

Said multivibrator produces pulses of about 20 milliseconds duration with a repetition rate of about 40 milliseconds. Said trigger increases the pulse front curvature and increases their power. These pulses, passed to the terminals of the base-emitter of the powerful transistor gate 14 (FIG. 2) causes periodic closing of this gate. As a result, the direct current source 15 is connected to the transmitter receiver loop 2 for a period of time, when each of said pulses is in action, and rectangular current pulses I, shown in FIG. 3, occur in this loop.

With further regard to the operation:

FIG. 2'A shows a diagram of current pulses I, inducing secondary currents in electrically conductive bodies;

FIG. 2'B shows a diagram of current pulses at the output of the delay circuit 13 when the early stages of the transient process are measured;

FIG. 2'C shows the state of the commutator 16 in relation to the exciting current pulses when the early stages of the transient process are measured;

FIG. 2'D shows a diagram of the current pulses at the output of the delay circuit 12;

FIG. 2'E shows a state of the gate in the memory block 8;

FIG. 2'F shows a diagram of the pulses at the output of the delay circuit 11;

FIG. 2'G shows a state of the gate in the block of the synchronous gate 9;

FIG. 2'B' shows a diagram of current pulses at the output of the delay circuit 13, when the late stages of the transient process are measured;

FIG. 2'C' shows a state of the commutator 16 in relation to the exciting current pulses 1 when the late stages of the transient process are measured;

FIG. 2'F' shows a diagram of the pulses at the output of the delay circuit 11, when the late stages of the transient processes are measured ($t=6$ to 15 milliseconds approx.);

FIG. 2'G' shows the state of the gate in the block of the synchronous gate 9.

Figure 3:
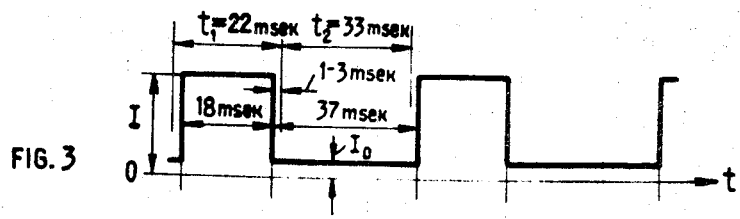

The commutator 16 (FIG. 2) is controlled by the delay circuit 13 (FIG. 1), which in turn is synchronized by the pulse generator 3. The delay circuit 13 produces rectangular pulses (FIG. 2'B) during the intervals between the exciting current pulses 1 (FIGS. 3 and 2'A). The pulses from the output of the delay circuit 13 are fed to the windings (not shown) of a polarized relay, which plays the role of a commutator 16 (FIG. 2) in the blocking device 5, and close the contacts $a$ and $b$. The state of the commutator relative to the current pulses 1 is shown in FIG. 2'C.

The contacts $a$ and $b$ are opened when the exciting current 1 passes through the loop 2 (FIG. 2) and they are closed with a small delay, due to the relay inertia, after the exciting current 1 disappears from the loop 2. During the intervals between the pulses, fed from the delay circuit 13 (FIG. 1) the contact $b$ of the relay 16 is connected to the contact $c$.

The memory 8 (FIG. 2) is controlled by the delay circuit 12 (FIG. 1), which is synchronized by the pulse generator 3.

The delay circuit 12 produces short periodically succeeding pulses (whose duration is approximately 0.1 millisecond) and said pulses being delayed relative to the current pulses 1 (FIG. 3 and FIG. 2'A) for a period of time $t\varphi$ approximately equal to 30 milliseconds (FIG. 2'D).

Said short pulses are fed to the gate of the memory 8 (terminals of the base-collector triodes 30 and 31, FIG. 2) and close it for the period of time equal to the time of action of each pulse (FIG. 2'E). During the intervals between the pulses fed from the delay circuit 12, said memory gate 8 (FIG. 2) is opened.

Figure 7:
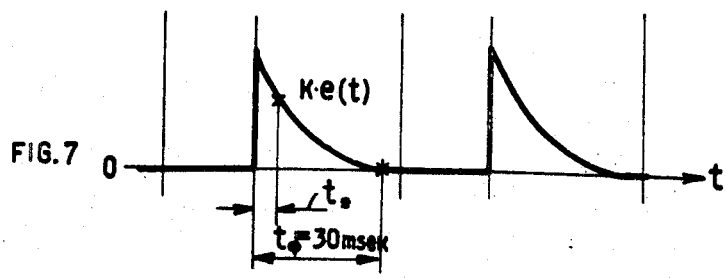
FIG. 7 shows a diagram of the signal level clamping circuit output voltage with indication of the sample made by the synchronous filter at a predetermined time $t_*$.
Figure 3:
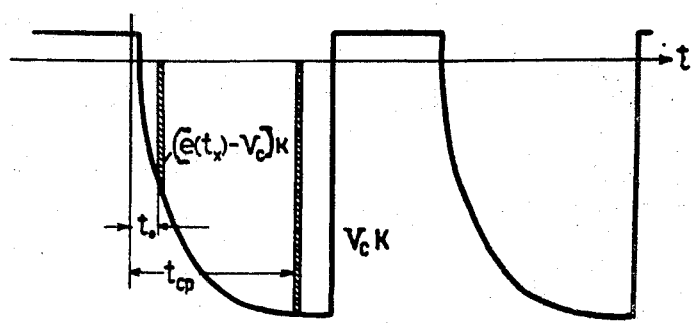
Figure 4:
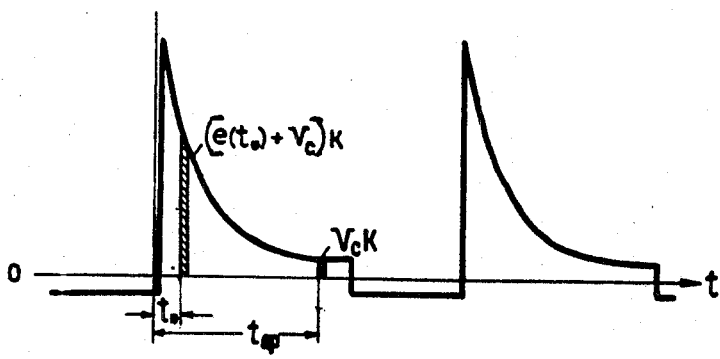

The synchronous filter 9 (FIG. 2) is essentially a combination of a synchronous gate and integrating cell and is controlled by the delay circuit 11 (FIG. 1). The delay circuit 11, synchronized by the pulse generator 3, produces short (approx. 0.1 millisecond) periodical pulses, delayed relative to the current pulses 1 (FIG. 3 and FIG. 2'A) for a period of time $t_*$ (FIG. 7 and FIG. 2'F). With the help of a switch (not shown) which is a part of a delay circuit 11, said period of time can be changed by increments and can be equal to, for example, 1; 1.5; 2.0; 2.5, etc. milliseconds.

Said short pulses are fed to the gate of the synchronous filter 9 (terminals of the base-collector triodes 32, 33, FIG. 2) and close it for the period of each pulse action (FIG. 2'G).

During the intervals between the pulses fed from the delay circuit 11, the gate of the synchronous filter 9 (FIG. 2) is opened.

The operation of the commutator has already been described. It should be noted that in the case of measuring early stages of the transient process ($t_*$ equals approximately 1 to 5 milliseconds), the delay circuit 13 (FIG. 1) produces pulses. shown in FIG. 2'B, whose leading edges practically coincide with the backs of the excited current pulses 1 (FIG. 3 and FIG. 2'A). As concerns the operation of the commutator 16, when the late stages of the transient process are measured, in this case the delay circuit 13 is set with the help of a switch (not shown)

which is a part of the circuit, to such operating conditions, when the leading edges of the pulses at the output of the delay circuit 13 are shifted relative to the trailing edges of the current pulses 1 (FIG. 3 and FIG. 2'A) to a period of time $t_1$ (about 5 milliseconds) as shown in FIG. 2'B. This time is quite enough for the received signal $e$ ($t_*$) to be reduced up to a value within the limits of the dynamic range of the amplifier 7.

In accordance with this, the contacts $a$, $b$, $c$ of the commutator 16 are closed during the measurement of the early stages of the transient process as it is shown in FIG. 2'C with a small delay relative to the pulses shown in FIG. 2'B, which delay is a result of inertia of the relay 16, and when the late stages thereof are measured, they are closed, as is shown in FIG. 2'C'.

Figure 4:
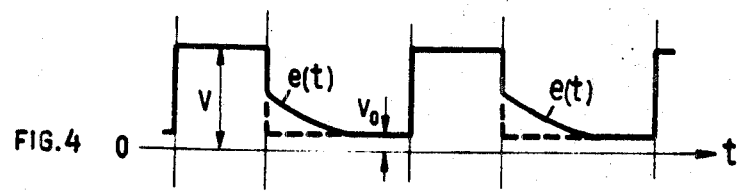
Figure 5:
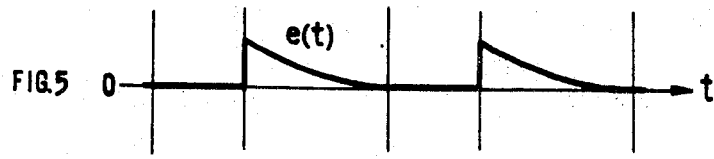
FIG. 5 shows a diagram of the blocking means output voltage when detecting an electrically conductive body.

When the early stages of the transient process are measured, the commutator 16 (FIG. 2) blocks the amplifier 7 from the exciting voltage pulses V (FIG. 4).

When measuring late stages of the transient process, the commutator 16 blocks the amplifier 7 also against overloading by an intensive signal occurring immediately after the primary current pulses 1 disappear, said signal being associated with the eddy currents in the earth, adjacent to the loop 2. Several milliseconds ($t_1 > 5$ milliseconds) after the current 1 disappears, said signal is, as a rule, so small that it cannot cause overloading of the amplifier 7.

The constant of the time of the circuit, comprising a capacitor 17 and resistance 18, is chosen great enough to insure that the useful signal $e(t)$, passed through this circuit, would almost not be distorted as to its shape during the interval when the contacts $a,b$ are closed. Therefor, the capacitor is charged by the voltage $V_o + e(t)$ (FIG. 4) sufficiently slowly, and said capacitor blocks only those noises which are charged very slowly or which are constant (it should be borne in mind that the useful signal $e(t)$ is as a rule negligibly small as compared to the voltage $V_o$; therefore it may be said that the capacitor 17 is practically charged up to the voltage $V_o$).

The noises $V_c$, which can be considered as constant only within the range of several periods, have no time to charge the capacitor 17 and get into the input of the amplifier 7.

Figure 6:
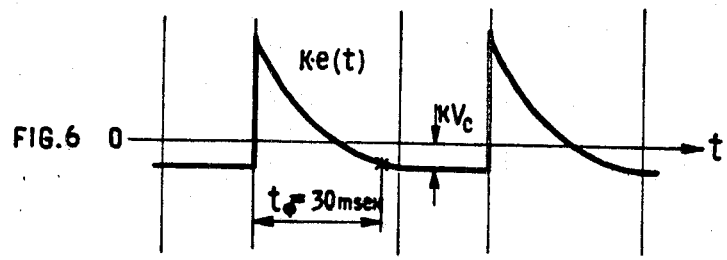

In this case at the amplifier output, the voltage can have a shape, shown in FIG. 3' or in FIG. 4', instead of the one shown in FIG. 6.

The capacitor 29 in the memory 8 (FIG. 2) is chosen small enough in order that it be charged up to the value $V_c k$ (where K is an amplification ratio of the amplifier 7) during one closing of the memory gate (triodes 30 and 31). Therefore, at each closing of the switch of the synchronous gate 9 (triodes 32 and 33) only the difference of the voltages $k[e_1 t_*] \pm V_c] \pm V_c k$ equal to $k \cdot e(t_*)$ and free from the noise $V_c$ gets into the integrating capacitor 34.

What is claimed is:

1. An induced pulse transient system comprising an exciting pulse generator; a transmitter-receiver loop electrically connected with said exciting pulse generator to excite electromagnetic field pulses around said loop, blocking means series-connected at the output of said transmitter-receiver loop, said blocking means including a commutator and receiving voltage pulses from the loop in response to an electrically conductive body in the zone of the electromagnetic field thereof, a pulse amplifier coupled to said blocking means, a synchronous filter coupled to said pulse amplifier, register means coupled to said filter, a capacitor inserted between said loop and commutator to block constant and slowly fluctuating noise modulated by said commutators, an amplifier signal level clamping circuit acting at the end of the interval between the exciting current pulses, said clamping circuit being synchronized by said generator and coupled between said pulse amplifier and said synchronous filter, whereby said register means, due to said blocking means and capacitor, receives a signal free from constant and slowly fluctuating noise, said signal characterizing the properties of electrically conductive bodies present in the zone of the electromagnetic field of the transmitter-receiver loop.

2. A system as claimed in claim 1, comprising a gain control in the said pulse amplifier, said gain control being so tuned that the voltage fed to the input of said amplifier proportional to the exciting current in the loop is characterized by a constant reading of said register means.

3. A system as claimed in claim 1, comprising between said generator and commutator a generator pulse delay circuit, said delay circuit providing feeding of the amplifier only with that portion of the signal, which is within the dynamic range of said amplifier, the measuring channel of the system being thus protected from signal overload.

References Cited
UNITED STATES PATENTS

| | | | |
|---|---|---|---|
| 3,020,471 | 2/1962 | Barringer | 324—6 |
| 3,105,934 | 10/1963 | Barringer | 324—6 XR |
| 3,315,155 | 4/1967 | Colani | 324—6 XR |

GERARD R. STRECKER, Primary Examiner

U.S. Cl. X.R.

324—41